US012780368B2

(12) United States Patent
Kim et al.

(10) Patent No.: US 12,780,368 B2
(45) Date of Patent: Nov. 3, 2026

(54) DRAFT MEASUREMENT SYSTEM AND METHOD BASED ON IMAGE PROCESSING USING ARTIFICIAL INTELLIGENCE TECHNOLOGY

(71) Applicant: HANWHA OCEAN CO., LTD., Geoje-Si (KR)

(72) Inventors: Yang Hyun Kim, Geoje-si (KR); Yong Woo Lee, Geoje-si (KR); Won Seok Bae, Geoje-si (KR); Dong Nyeong Lee, Geoje-si (KR); Tai Gon Kim, Geoje-si (KR)

(73) Assignee: Hanwha Ocean Co., Ltd., Geoje-Si (KR)

( * ) Notice: Subject to any disclaimer, the term of this patent is extended or adjusted under 35 U.S.C. 154(b) by 257 days.

(21) Appl. No.: 18/717,195

(22) PCT Filed: Dec. 19, 2023

(86) PCT No.: PCT/KR2023/020986
§ 371 (c)(1),
(2) Date: Jun. 6, 2024

(87) PCT Pub. No.: WO2024/136404
PCT Pub. Date: Jun. 27, 2024

(65) Prior Publication Data

US 2026/0152266 A1 Jun. 4, 2026

(30) Foreign Application Priority Data

Dec. 19, 2022 (KR) ........................ 10-2022-0178522
Dec. 6, 2023 (KR) ........................ 10-2023-0175883

(51) Int. Cl.
*B63B 39/12* (2006.01)
*B63B 79/00* (2020.01)
(Continued)

(52) U.S. Cl.
CPC .............. *B63B 39/12* (2013.01); *B63B 79/00* (2020.01); *G06N 3/0464* (2023.01); *G06T 5/80* (2024.01);
(Continued)

(58) Field of Classification Search
CPC ......... B63B 39/12; B63B 79/00; B63B 79/20; G06N 3/0464; G06N 3/045; G06N 3/08;
(Continued)

(56) References Cited

U.S. PATENT DOCUMENTS

2020/0148317 A1 * 5/2020 Epskamp ................ B63B 39/12

FOREIGN PATENT DOCUMENTS

CN 102975826 A 3/2013
CN 115165027 A * 10/2022 ............ G06V 10/44
(Continued)

OTHER PUBLICATIONS

International Search Report for International Application No. PCT/KR2023/020986, dated Apr. 1, 2024, in 3 pages.
(Continued)

*Primary Examiner* — Thomas M Hammond, III
(74) *Attorney, Agent, or Firm* — Knobbe, Martens, Olson & Bear, LLP

(57) ABSTRACT

A draft measurement system and method based on image processing using artificial intelligence technology. The draft measurement system and method can improve the accuracy of draft measurement by preventing errors in image processing that can occur depending on the shooting angle, the picture quality, the degree of surface contamination of a hull, and the like, through application of artificial intelligence technology to images extracted from video data, and can determine a draft value based on video data acquired in real time using technology such as a deep learning model for segmentation for draft mark edge detection and waterplane
(Continued)

recognition and an edge detection algorithm and distortion correction algorithm for waterplane detection.

19 Claims, 17 Drawing Sheets

(51) Int. Cl.
*G06N 3/0464* (2023.01)
*G06T 5/80* (2024.01)
*G06T 7/12* (2017.01)
*G06T 7/13* (2017.01)
*G06V 20/17* (2022.01)

(52) U.S. Cl.
CPC .................. *G06T 7/12* (2017.01); *G06T 7/13* (2017.01); *G06V 20/17* (2022.01); *G06V 2201/07* (2022.01)

(58) Field of Classification Search
CPC .... G06T 5/80; G06T 7/12; G06T 7/13; G06T 2207/10016; G06T 2207/10032; G06T 2207/20084; G06T 7/62; G06V 20/17; G06V 2201/07; B64U 2101/26; B64U 2101/30
See application file for complete search history.

(56) References Cited

FOREIGN PATENT DOCUMENTS

| | | | | | |
|---|---|---|---|---|---|
| JP | 2022-500917 | A | | 1/2022 | |
| KR | 10-2014-0033597 | A | | 3/2014 | |
| KR | 10-2015-0035233 | A | | 4/2015 | |
| KR | 10-2015-0141840 | A | | 12/2015 | |
| KR | 20150141840 | A | * | 12/2015 | ........... G01C 13/002 |
| KR | 10-2017-0043032 | A | | 4/2017 | |
| KR | 10-2018-0023352 | A | | 3/2018 | |
| KR | 10-2018-0097097 | A | | 8/2018 | |
| KR | 10-2321942 | B1 | | 11/2021 | |
| WO | WO 2021/193015 | A1 | | 9/2021 | |
| WO | WO 2022/254715 | A1 | | 12/2022 | |

OTHER PUBLICATIONS

Office Action received in Japanese Application No. 2024-534030 dated Jul. 1, 2025.

Notice of Allowance received in Korean Application No. 10-2023-0175883 dated Nov. 1, 2024.

* cited by examiner (a)

(b)

(c)

(a) (b) (c)

(a) (b) (c)

(b)

(a)

(a) (b) (c) (d)

(b)

(a)

(a)

Outlier definition using IQR (b)

DRAFT MEASUREMENT SYSTEM AND METHOD BASED ON IMAGE PROCESSING USING ARTIFICIAL INTELLIGENCE TECHNOLOGY

TECHNICAL FIELD

The present invention relates to a draft measurement system and method based on image processing using artificial intelligence technology, which can improve the accuracy of draft measurement by preventing errors in image processing that can occur depending on the shooting angle, the picture quality, the degree of surface contamination of a hull, and the like, through application of artificial intelligence technology to images extracted from video data, and can determine a draft value based on video data acquired in real time using technology such as a deep learning model for segmentation for draft mark edge detection and waterplane recognition and an edge detection algorithm and distortion correction algorithm for waterplane detection.

BACKGROUND ART

Typically, ships are subjected to an inclining test and a deadweight test at the launch stage after completion of construction. Here, in order to calculate the displacement of the ship below a waterline, it is necessary to measure a draft of the ship. Conventionally, a trained person directly measures the draft using a draft gauge after approaching draft marks painted on each side of the ship at the bow, stern, and amidships by boarding a workboat. However, this work is highly prone to accidents, such as crush injuries, drowning, and musculoskeletal injuries due to postural instability. In addition, measurement results can vary depending on environmental conditions, such as wind, waves, and swells, and the skill level of the measurer.

DISCLOSURE

Technical Tasks

It is one aspect of the present invention to provide a draft measurement system and method based on image processing using artificial intelligence technology, which can improve the accuracy of draft measurement by preventing errors in image processing that can occur depending on the shooting angle, the picture quality, the degree of surface contamination of a hull, and the like, through application of artificial intelligence technology to images extracted from video data, and can determine a draft value based on video data acquired in real time using technology such as a deep learning model for segmentation for draft mark edge detection and waterplane recognition, an edge detection algorithm and distortion correction algorithm for waterplane detection, a drone and a handheld video camera, and video reception/transmission and streaming technology.

It is another aspect of the present invention to provide a draft measurement system and method based on image processing using artificial intelligence technology, which can improve the accuracy of draft measurement by preventing errors in image processing that can occur depending on the shooting angle, the picture quality, the degree of surface contamination of a hull, and the like, through application of artificial intelligence technology to images extracted from video data, and can determine a draft value using technology such as a deep learning model for segmentation for draft mark edge detection and waterplane recognition and algorithms for draft point definition and distortion correction.

Technical Solution

In accordance with one aspect of the present invention, a draft measurement system based on image processing using artificial intelligence technology includes: a drone or a video acquisition device photographing a waterplane and draft marks including numbers marked on both sides of a ship, the video acquisition device including a camcorder; and a draft measurement system receiving a video captured by the drone or the video acquisition device and calculating a draft based thereon, wherein the draft measurement system includes: a preprocessing unit converting the received video into image frames; a draft mark recognition unit recognizing a draft mark from the image frames obtained by the preprocessing unit; a waterline detection unit detecting a waterline from the image frames obtained by the preprocessing unit; a measurement unit measuring a distance in pixels from the draft mark recognized by the draft mark recognition unit to the waterline detected by the waterline detection unit; a distortion correction unit correcting distortion in X-axis and Y-axis directions in data measured by the measurement unit; and a calculation unit calculating a draft based on the data corrected by the distortion correction unit.

The waterline detection unit may include an extraction unit detecting waterline edges from the image frames to recognize a waterplane through segmentation based on the waterline edges detected by the extraction unit.

The measurement unit may include: a first measurement unit measuring a distance in pixels from the draft mark recognized by the draft mark recognition unit to a draft mark above the waterline; and a second measurement unit measuring a distance in pixels from the draft mark recognized by the draft mark recognition unit to the waterline.

The distortion correction unit may perform perspective transformation assuming a surface of the ship with the draft marks marked thereon to be a flat surface, may correct distortion in the X-axis direction by measuring a level of the waterline from the video corrected through perspective transformation, and may correct distortion in the Y-axis direction by predicting a value in the Y-axis direction through correction of distortion in the X-axis direction.

The draft measurement system may further include: a monitoring server displaying the draft calculated by the calculation unit in real time for a monitoring purpose or storing the calculated draft.

In accordance with another aspect of the present invention, a draft measurement system based on image processing using artificial intelligence technology includes: a drone or a video acquisition device photographing a waterplane and draft marks including numbers marked on both sides of a ship, the video acquisition device including a camcorder; and a draft measurement system receiving a video captured by the drone or the video acquisition device and calculating a draft based thereon, wherein the draft measurement system includes: a preprocessing unit converting the received video into image frames; an object recognition unit detecting and localizing a draft mark as an object from the image frames obtained by the preprocessing unit; a draft measurement reference point definition unit detecting a waterline from the image frames obtained by the preprocessing unit and defining a draft measurement reference point; a distortion correction unit correcting distortion in the draft mark recognized by the object recognition unit and distortion in the draft measurement reference point defined by the draft measurement reference point definition unit; a measurement unit measuring a distance from the draft mark corrected in distortion by the distortion correction unit to the draft measurement reference point corrected in distortion by the distortion correction unit; and a calculation unit calculating a draft based on data measured by the measurement unit.

In accordance with a further aspect of the present invention, a draft measurement method based on image processing using artificial intelligence technology includes: a video acquisition step in which a drone or a video acquisition device, such as a camcorder, photographs a waterplane and draft marks including numbers marked on both sides of a ship; a preprocessing step in which a draft measurement system receives a video captured by the drone or the video acquisition device in the video acquisition step and a preprocessing unit of the draft measurement system converts the received video into image frames; a draft mark recognition step in which the draft measurement system recognizes a draft mark from the image frames obtained in the preprocessing step; a waterline detection step in which the draft measurement system detects a waterline from the image frames obtained in the preprocessing step; a measurement step in which the draft measurement system measures a distance in pixels from the draft mark recognized in the draft mark recognition step to the waterline detected in the waterline detection step; a distortion correction step in which the draft measurement system corrects distortion in X-axis and Y-axis directions in data measured in the measurement step; and a calculation step in which the draft measurement system calculates a draft based on the data corrected in the distortion correction step.

The waterline detection step may include: detecting, by the draft measurement system, waterline edges to detect the waterline; and recognizing, by the draft measurement system, a waterplane through segmentation based on the detected waterline edges.

The measurement step may include: a first measurement step in which a deep learning model of the draft measurement system measures a distance in pixels from the draft mark recognized in the draft mark recognition step to a draft mark above the waterline; and a second measurement step in which the deep learning model of the draft measurement system measures a distance in pixels from the draft mark recognized in the draft mark recognition step to the waterline.

The distortion correction step may include: a perspective transformation step in which a surface of the ship with the draft marks marked thereon is assumed to be a flat surface; an X-axis distortion correction step in which distortion in the X-axis direction is corrected by measuring a level of the waterline from the video corrected in the perspective transformation step; and a Y-axis distortion correction step in which distortion in the Y-axis direction is corrected by predicting a value in the Y-axis direction through the X-axis distortion correction step.

The draft measurement method may further include: a monitoring step in which the draft calculated in the calculation step is transmitted to a monitoring server to be displayed and monitored in real time or to be stored.

In accordance with yet another aspect of the present invention, a draft measurement method based on image processing using artificial intelligence technology includes: a video acquisition step in which a video acquisition device photographs a waterplane and draft marks including numbers marked on both sides of a ship; a preprocessing step in which a draft measurement system receives a video captured by the video acquisition device in the video acquisition step and a preprocessing unit of the draft measurement system converts the received video into image frames; an object recognition step in which the draft measurement system detects and localizes a draft mark as an object from each of the image frames obtained in the preprocessing step; a draft measurement reference point definition step in which the draft measurement system detects a waterline from the image frames obtained in the preprocessing step and defines a draft measurement reference point; a distortion correction step in which the draft measurement system corrects distortion in the draft mark recognized in the object recognition step and distortion in the reference point defined in the draft measurement reference point definition step; a measurement step in which the draft measurement system measures a distance from the draft mark corrected in the distortion correction step to the draft measurement reference point corrected in the distortion correction step; an outlier removal step in which the draft measurement system removes outliers from data measured in the measurement step; and a calculation step in which the draft measurement system calculates a draft based on the data subjected to outlier removal in the outlier removal step.

The object recognition step may include detecting and localizing a draft mart as an object from the image frames using a Mask R-CNN model.

The draft measurement reference point definition step may include a segmentation step in which the draft measurement system performs semantic segmentation for localization of waterline edges using an artificial intelligence model including U-Net to detect the waterline, wherein the draft measurement reference point may be defined by a point of intersection between the segmented waterline and a straight line selected using a voting algorithm based on the object detected in the object recognition step and the waterline segmented in the segmentation step.

The distortion correction step may include correcting size distortion of a draft mark due to a shooting position using a scaling algorithm, wherein the scaling algorithm may be configured to correct the distortion by estimating a height of the draft mark based on proportional variations in size of the draft mark across image frames.

The outlier removal step may include detecting outliers in analysis results of each image frame based on statistical univariate data, such as standardized scores and interquartile ranges, removing the outliers from the analysis results, and deriving a final draft value as an arithmetic mean.

The draft measurement method may further include: a monitoring step in which the draft calculated in the calculation step is transmitted to a monitoring unit to be displayed and monitored in real time or to be stored.

In accordance with yet another aspect of the present invention, a computer-readable recording medium records a computer program for executing the draft measurement method set forth above on a computer.

Advantageous Effects

The draft measurement system and method according to the present invention can improve the accuracy of draft measurement by preventing errors in image processing that can occur depending on the shooting angle, the picture quality, the degree of surface contamination of a hull, and the like, through application of artificial intelligence technology to images extracted from video data.

The draft measurement system and method according to the present invention can determine a draft value based on video data acquired in real time using technology such as a deep learning model for segmentation for draft mark edge detection and waterplane recognition, an edge detection algorithm and distortion correction algorithm for waterplane detection, a drone and a handheld video camera, and video reception/transmission and streaming technology.

The draft measurement system and method according to the present invention can prevent accidents that can occur during draft measurement, such as musculoskeletal injuries, crush injuries, and drowning, while ensuring acquisition of reliable and accurate measurements, as compared with direct visual measurement.

EMBODIMENTS

Figure 1:
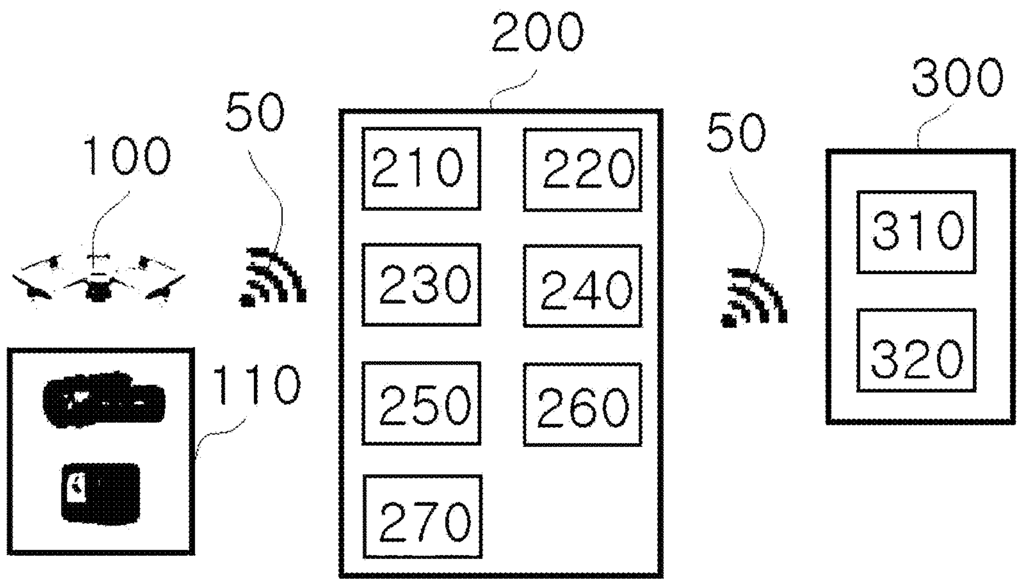
FIG. 1 is a diagram of a draft measurement system based on image processing using artificial intelligence technology according to the present invention.

The above and other aspects, features, and advantages of the present invention will become apparent from the detailed description of the following embodiments in conjunction with the accompanying drawings.

The terminology used herein is for the purpose of describing particular embodiments and is not intended to be limiting. As used herein, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. Further, as used herein, the singular forms "a", "an" and "the" are intended to include the plural forms as well, unless the context clearly indicates otherwise.

Hereinafter, exemplary embodiments of the present invention will be described in detail with reference to the accompanying drawings. It should be understood that the embodiments are provided for complete disclosure and thorough understanding of the present invention by those skilled in the art and that the present invention is not limited to the following embodiments and may be embodied in different ways by those skilled in the art.

Referring to FIG. 1 to FIG. 9, a draft measurement system based on image processing using artificial intelligence technology according to one embodiment of the present invention includes: a drone 100 or a video acquisition device 110 photographing a waterplane and draft marks including numbers marked on both sides of a ship, the video acquisition device including a camcorder; and a draft measurement system 200 receiving a video captured by the drone 100 or the video acquisition device 110 and calculating a draft based thereon.

The draft measurement system 200 may include: a preprocessing unit 210 converting the received video into image frames; a draft mark recognition unit 220 recognizing a draft mark from the image frames obtained by the preprocessing unit 210; a waterline detection unit 240 detecting a waterline from the image frames obtained by the preprocessing unit 210; a measurement unit 250 measuring a distance in pixels from the draft mark recognized by the draft mark recognition unit 220 to the waterline detected by the waterline detection unit 240; a distortion correction unit 260 correcting distortion in X-axis and Y-axis directions in data measured by the measurement unit 250; and a calculation unit 270 calculating a draft based on the data corrected by the distortion correction unit 260.

The waterline detection unit 240 may further include an extraction unit 230 detecting waterline edges from the image frames to recognize a waterplane through segmentation based on the waterline edges detected by the extraction unit 230.

The measurement unit 250 may include: a first measurement unit 251 measuring a distance in pixels from the draft mark recognized by the draft mark recognition unit 220 to a draft mark above the waterline; and a second measurement unit 252 measuring a distance in pixels from the draft mark recognized by the draft mark recognition unit 220 to the waterline.

The distortion correction unit 260 may perform perspective transformation assuming a surface of the ship with the draft marks marked thereon to be a flat surface, may correct distortion in the X-axis direction by measuring a level of the waterline from video data corrected through perspective transform, and may correct distortion in the Y-axis direction by predicting a value in the Y-axis direction through correction of distortion in the X-axis direction.

The draft measurement system according to the present invention may further include a monitoring server 300 that displays a draft calculated by the calculation unit 270 in real time for the purpose of monitoring or stores the calculated draft therein.

That is, the monitoring server 300 may include a storage unit 310 storing the calculated draft and a display unit 320 displaying the calculated draft for the purpose of real-time monitoring.

Figure 2:
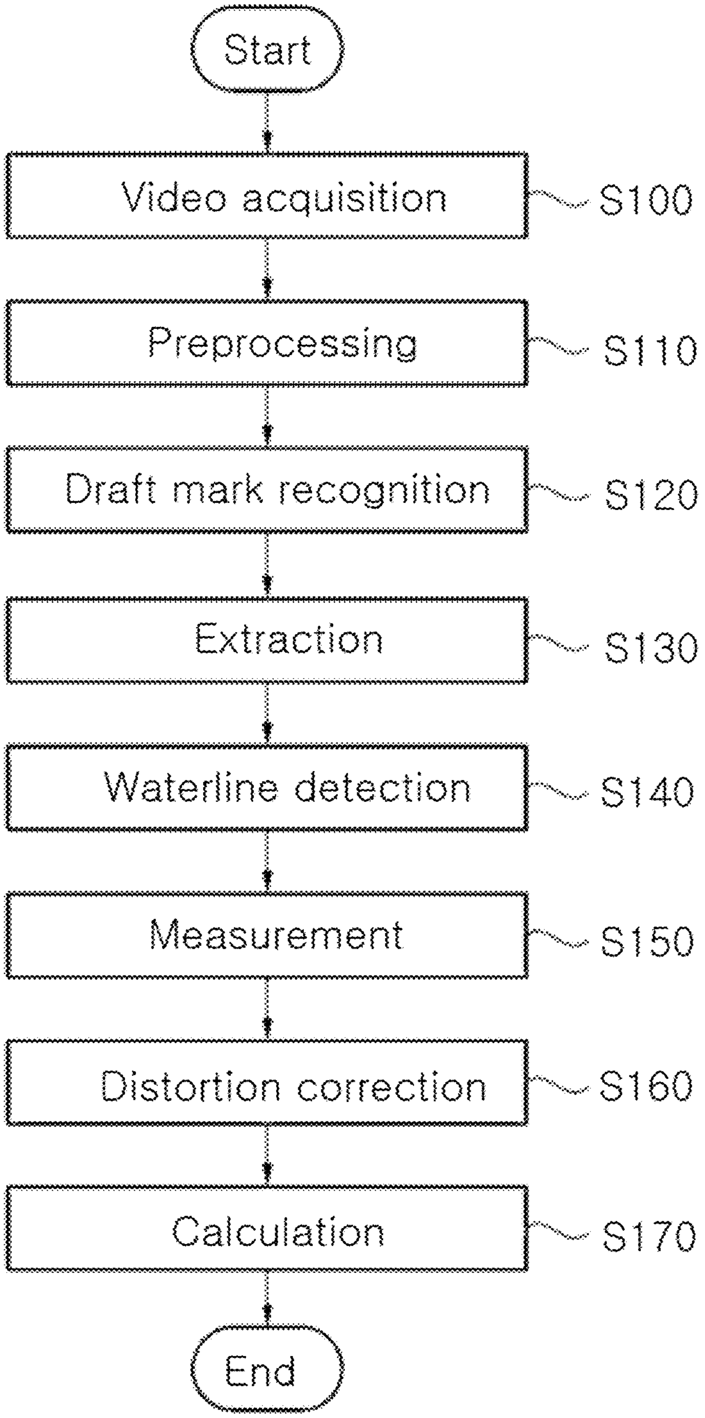
FIG. 2 is a flow diagram of a draft measurement method based on image processing using artificial intelligence technology according to the present invention.

Referring to FIG. 2, a draft measurement method based on image processing using artificial intelligence technology according to the present invention may include: a video acquisition step S100 in which a drone or a video acquisition device, such as a camcorder, photographs a waterplane and draft marks including numbers marked on both sides of a ship; a preprocessing step S110 in which a draft measurement system receives a video captured by the drone or the video acquisition device in the video acquisition step S100 and a preprocessing unit of the draft measurement system converts the received video into image frames; a draft mark recognition step S120 in which the draft measurement system recognizes a draft mark from the image frames obtained in the preprocessing step S110; a waterline detection step S140 in which the draft measurement system detects a waterline from the image frames obtained in the preprocessing step S110; a measurement step S150 in which the draft measurement system measures a distance in pixels from the draft mark recognized in the draft mark recognition step S120 to the waterline detected in the waterline detection step S140; a distortion correction step S160 in which the draft measurement system corrects distortion in X-axis and Y-axis directions in data measured in the measurement step S150; and a calculation step S170 in which the draft measurement system calculates a draft based on the data corrected in the distortion correction step S160.

The waterline detection step S140 includes an edge detection step S130 in which the draft measurement system detects waterline edges to detect the waterline, such that a waterplane is recognized through segmentation based on the waterline edges detected in the edge detection step S130.

The measurement step S150 may include: a first measurement step S151 in which a deep learning model of the draft measurement system measures a distance in pixels from the draft mark recognized in the draft mark recognition step S120 to a draft mark above the waterline; and a second measurement step S152 in which the deep learning model of the draft measurement system measures a distance in pixels from the draft mark recognized in the draft mark recognition step S120 to the waterline.

The distortion correction step S160 may include: a perspective transformation step S161 in which a surface of the ship with the draft marks marked thereon is assumed to be a flat surface; an X-axis distortion correction step S162 in which distortion in the X-axis direction is corrected by measuring a level of the waterline from the video data corrected in the perspective transformation step; and a Y-axis distortion correction step S163 in which distortion in the Y-axis direction is corrected by predicting a value in the Y-axis direction through the X-axis distortion correction step S162.

The draft measurement method according to the present invention may further include: a monitoring step S180 in which a draft calculated in the calculation step S170 is transmitted to a monitoring server to be displayed and monitored in real time or to be stored.

Figure 3:
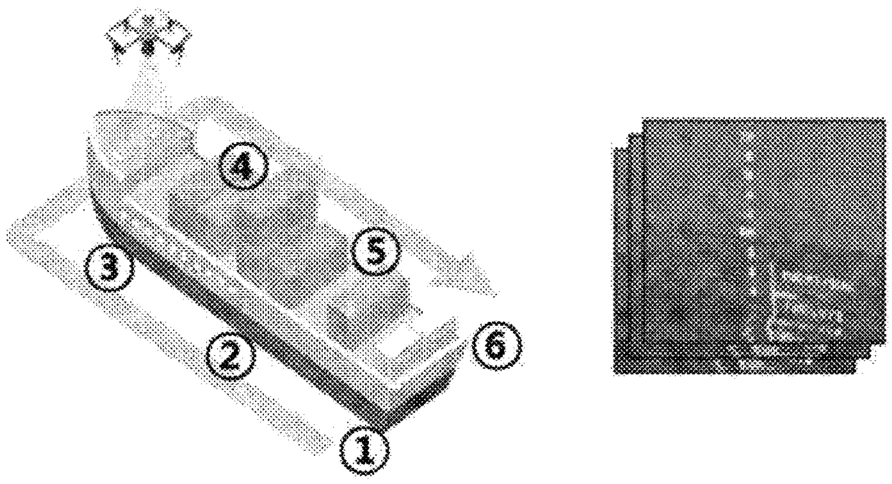
FIG. 3 is a view illustrating a video acquisition step in the draft measurement method according to the present invention.

FIG. 3 is a view illustrating the video acquisition step in the draft measurement method according to the present invention, wherein the drone 100 flying under control photographs a waterplane and draft marks including numbers marked on both sides of a ship.

Alternatively, the video acquisition device 110, such as a camcorder, may be used to photograph a waterplane and draft marks including numbers marked on both sides of a ship.

A video captured by the drone or the video acquisition device may be transmitted as video data to the draft measurement system 200 via a network 50, and the draft measurement system 200 may perform draft measurement based on the received video data.

Upon receiving the video data, the draft measurement system 200 may perform multi-video streaming. Here, the received video data may be immediately transmitted to the monitoring server 300, or may be transmitted to the monitoring server 300 after waterline measurement.

Figure 4:
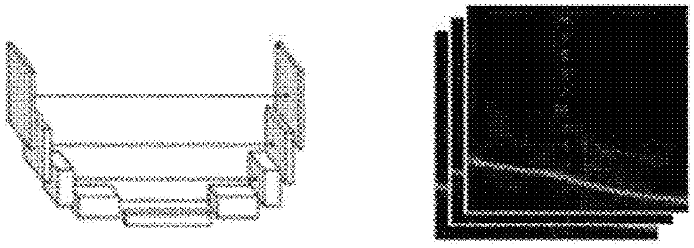
FIG. 4 is a view illustrating an extraction step in the draft measurement method according to the present invention.
Figure 4:
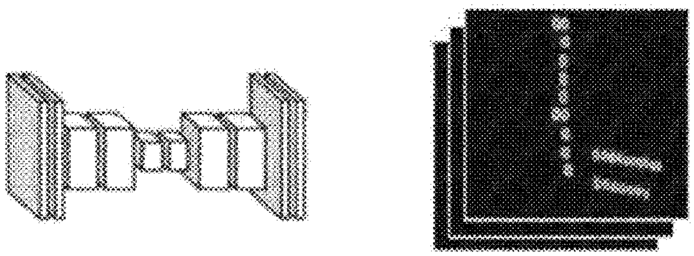
Figure 4:
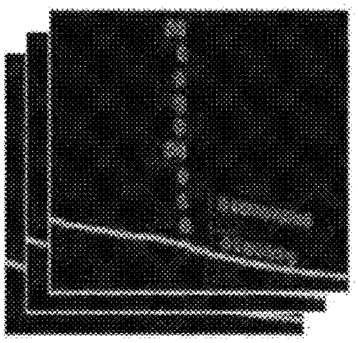

FIG. 4 is a view illustrating an extraction step in the draft measurement method according to the present invention, wherein FIG. 4(*a*) illustrates a process of extracting a waterline from image frames obtained in the preprocessing step S110, and FIG. 4(*b*) illustrates a process of extracting a character area and geometric information from a draft mark.

FIG. 4(*c*) illustrates a process of extracting a region of interest by aggregating the extracted information.

That is, an exact value of the waterline may be obtained by measuring a distance in pixels from a reference draft mark to a draft mark above the waterline, followed by measuring a distance in pixels from the reference draft mark to the waterline.

In addition, the waterline may be read by recognizing a reference mark M for reading using a Mask-RCNN model, followed by reading based on the distance proportion between the reference mark and surrounding numeric marks and recognition of a location of a water surface.

That is, an exact value of the waterline may be obtained by measuring a distance in pixels from a reference draft mark to a draft mark above the waterline, followed by measuring a distance in pixels from the reference draft mark to the waterline.

More specifically, upon extracting a draft mark, a first labeled image may be formed by assigning a first label to a numeric area of the draft mark, and a second labeled image may be formed by further assigning a second label to an area of the first labeled image between numbers of the draft mark.

In addition, the first labeled image may be formed through a process in which a numeric area of the draft mark is recognized and an image of a corresponding number is recognized and then assigned as the first label having a predetermined size to the numeric area, and the second labeled image may be formed through a process in which an area between numbers in the first labeled image is recognized and an image of a number corresponding to an intermediate value that can lie between the numbers is recognized and then assigned as the second label having a predetermined size to the area.

In addition, upon forming the first labeled image, the draft measurement system may perform recognition of a numeric area of the draft mark and recognition of an image of a corresponding number, and, upon forming the second labeled image, the draft measurement system may perform recognition of an area between numbers and calculation of a number corresponding to an intermediate value that can lie between the numbers.

In addition, upon extracting a draft mark, the draft measurement system may compute a draft using a numerical ratio of the first label adjacent to the waterline to the second label adjacent to the first label based on a standard size of the draft mark, or may extract the draft mark using a numerical ratio of the second label adjacent to the waterline to the first label adjacent to the second label based on the standard size of the draft mark.

Figure 5:
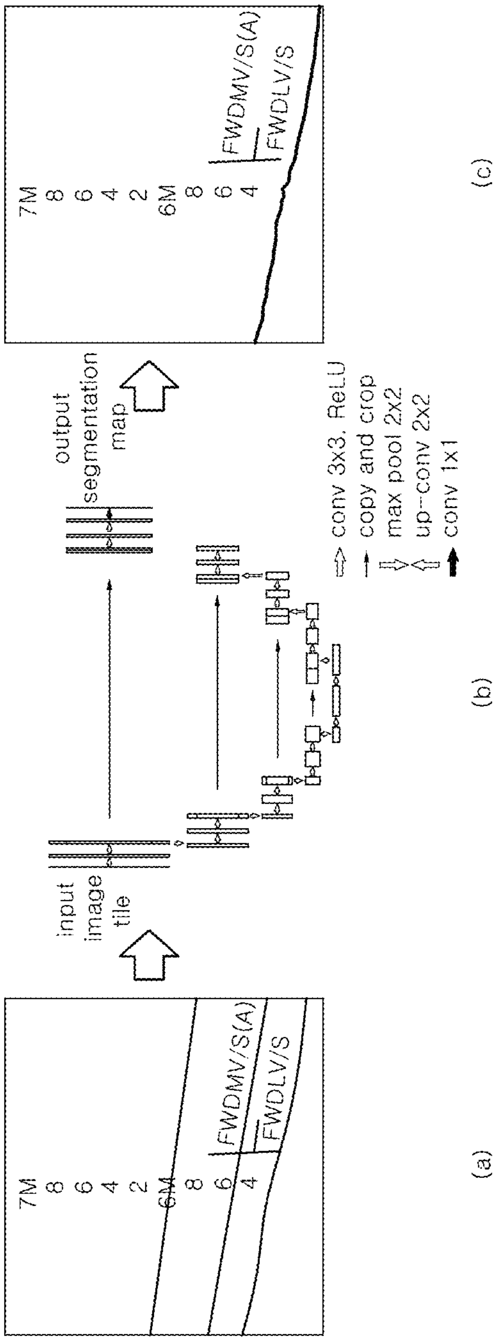
FIG. 5 is a view illustrating a waterline detection step in the draft measurement method according to the present invention.

FIG. 5 is a view illustrating the waterline detection step in the draft measurement method according to the present invention, wherein FIG. 5(*a*) shows an original image from video data acquired by the drone or the video acquisition device, such as a camcorder, FIG. 5(*b*) shows detection of a waterline using an artificial intelligence model of the draft measurement system, and FIG. 5(*c*) shows recognition of a waterplane through segmentation of a waterline.

That is, the draft measurement system may recognize a waterplane through segmentation of a waterline using a U-Net algorithm.

Figure 6:
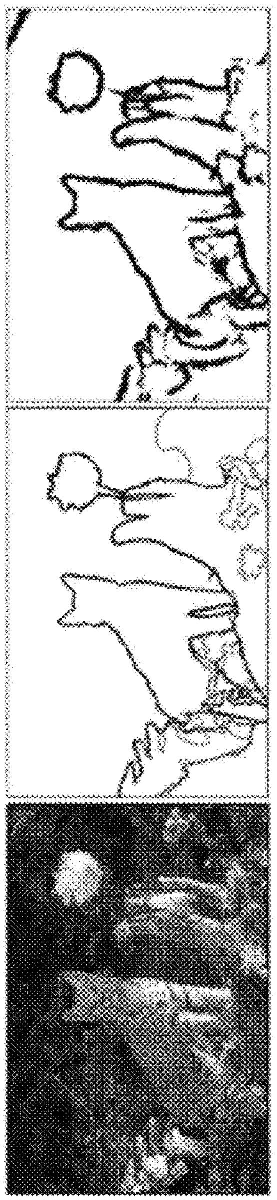
FIG. 6 and FIG. 7 are conceptual views illustrating waterline detection through edge detection and segmentation processes in the draft measurement method according to the present invention.
Figure 7:
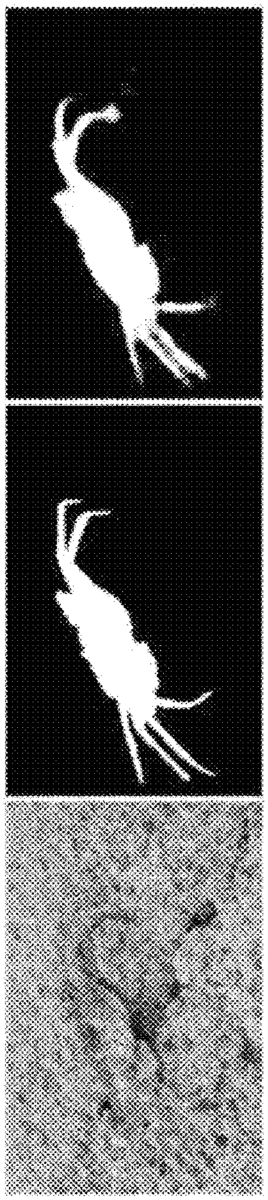

FIG. 6 and FIG. 7 are conceptual views illustrating waterline detection through edge detection and segmentation processes in the draft measurement method according to the present invention, wherein FIG. 6(*a*) shows an original image, FIG. 6(*b*) shows an edge-detected image, and FIG. 6(*c*) shows an inference result.

In addition, FIG. 7(*a*) shows an original image, FIG. 7(*b*) shows a segmented image, and FIG. 7(*c*) shows a detection result.

In this way, the waterline edges can be detected and the waterline can be detected based on the detected waterline edges.

Figure 8:
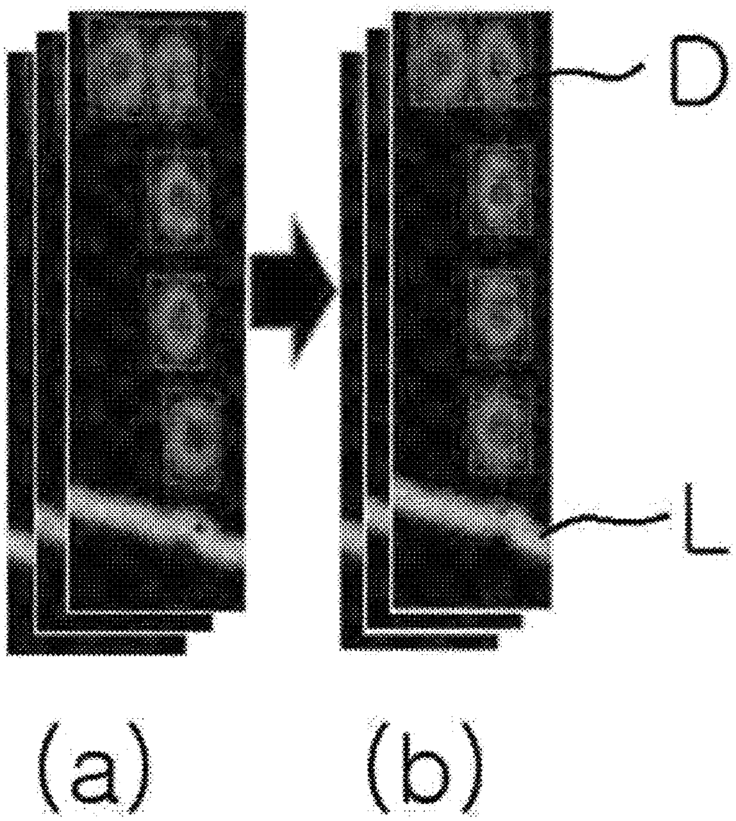
FIG. 8 is a view illustrating distortion correction and waterline calculation processes in the draft measurement method according to the present invention.

FIG. 8 is a view illustrating distortion correction and waterline calculation processes in the draft measurement method according to the present invention, wherein a surface of the ship with draft marks marked thereon is assumed to be a flat surface through perspective transformation using character area information, a level of the waterline is measured by correcting distortion in the X-axis direction in video data corrected through perspective transformation, and a value of the waterline is calculated by correcting distortion in the Y-axis direction in the video data.

This can ensure more accurate and rapid waterline measurement than visual measurement.

Figure 9:
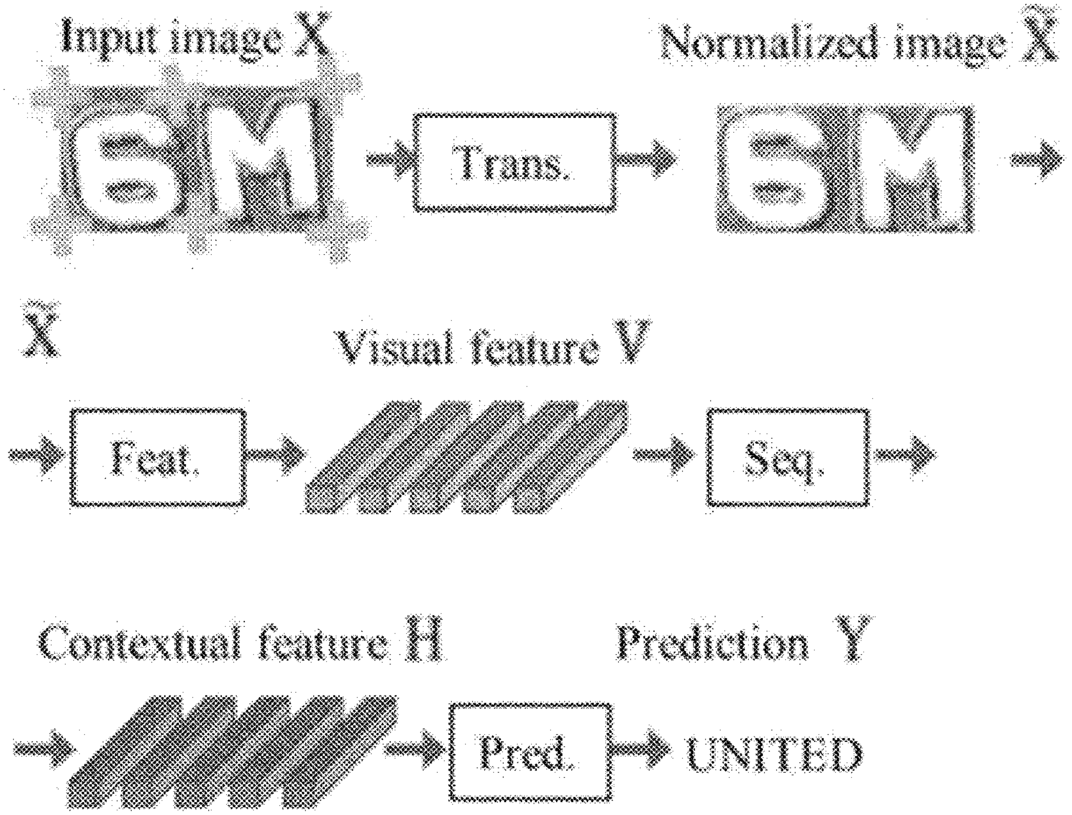
FIG. 9 is a view illustrating draft mark character recognition and post-processing processes in the draft measurement method according to the present invention.

FIG. 9 is a view illustrating draft mark character recognition and post-processing processes in the draft measurement method according to the present invention, wherein a draft mark is extracted through draft mark character recognition and post-processing performed to correct distortion in the X-axis and Y-axis directions, and a distance in pixels from the extracted draft mark to the waterline is measured.

Referring to FIG. 10 to FIG. 17, a draft measurement system based on image processing using artificial intelligence technology according to another embodiment of the present invention includes: a drone 100 or a video acquisition device 110 photographing a waterplane and draft marks including numbers marked on both sides of a ship, the video acquisition device 110 including a camcorder; and a draft measurement system 200 receiving a video captured by the drone 100 or the video acquisition device 110 and calculating a draft based thereon.

The draft measurement system 200 may include: a preprocessing unit 210 converting the received video into image frames; an object recognition unit 220 detecting and localizing a draft mark as an object from the image frames obtained by the preprocessing unit 210; a draft measurement reference point definition unit 240 detecting a waterline from the image frames obtained by the preprocessing unit 210 and defining a draft measurement reference point; a distortion correction unit 250 correcting distortion in the draft mark recognized by the object recognition unit 220 and distortion in the draft measurement reference point defined by the draft measurement reference point definition unit 240; a measurement unit measuring a distance from the draft mark corrected in distortion by the distortion correction unit 250 to the draft measurement reference point corrected in distortion by the distortion correction unit 250; and a calculation unit calculating a draft based on data measured by the measurement unit 260.

The draft measurement reference point definition unit 240 may further include a detection unit 230 detecting waterline edges from the image frames to recognize a waterplane through semantic segmentation based on the waterline edges detected by the detection unit 230.

The measurement unit 260 may include: a first measurement unit 261 measuring a distance in pixels from the draft mark recognized by the object recognition unit 220 to a draft mark above the waterline; and a second measurement unit 262 measuring a distance in pixels from the draft mark recognized by the object recognition unit 220 to the waterline.

The drone 100 or the video acquisition device 110, such as a camcorder, may photograph a waterplane and draft marks including numbers marked on both sides of the ship.

A video captured by the drone 100 or the video acquisition device 110 may be transmitted as video data to the draft measurement system 200 via a network 50, and the draft measurement system 200 may perform draft measurement based on the received video data.

Upon receiving the video data, the draft measurement system 200 may perform multi-video streaming. Here, the received video data may be immediately transmitted to a monitoring server 300, or may be transmitted to the monitoring server 300 after waterline measurement.

The object recognition unit 220 may recognize an object using an artificial intelligence model including Mask R-CNN.

In addition, the waterline may be read by recognizing a reference mark M for reading using a Mask-RCNN model, followed by reading based on the distance proportion between the reference mark and surrounding numeric marks and recognition of a location of a water surface.

That is, an exact value of the waterline may be obtained by measuring a distance in pixels from a reference draft mark to a draft mark above the waterline, followed by measuring a distance in pixels from the reference draft mark to the waterline.

More specifically, upon extracting a draft mark, a first labeled image may be formed by assigning a first label to a numeric area of the draft mark, and a second labeled image may be formed by further assigning a second label to an area of the first labeled image between numbers of the draft mark.

In addition, the first labeled image may be formed through a process in which a numeric area of the draft mark is recognized and an image of a corresponding number is recognized and then assigned as the first label having a predetermined size to the numeric area, and the second labeled image may be formed through a process in which an area between numbers in the first labeled image is recognized and an image of a number corresponding to an intermediate value that can lie between the numbers is recognized and then assigned as the second label having a predetermined size to the area.

In addition, upon forming the first labeled image, the draft measurement system may perform recognition of a numeric area of the draft mark and recognition of an image of a corresponding number, and, upon forming the second labeled image, the draft measurement system may perform recognition of an area between numbers and calculation of a number corresponding to an intermediate value that can lie between the numbers.

In addition, upon extracting a draft mark, the draft measurement system may compute a draft using a numerical ratio of the first label adjacent to the waterline to the second label adjacent to the first label based on a standard size of the draft mark, or may extract the draft mark using a numerical ratio of the second label adjacent to the waterline to the first label adjacent to the second label based on the standard size of the draft mark.

Here, the Mask R-CNN model has a structure in which a classification branch predicting a class of an object and a mask branch predicting a segmentation mask in parallel with a bounding box regression branch are added to a region of interest (RoI) obtained from an RPN of a Faster R-CNN model.

The mask branch has a structure in which a small fully convolutional network (FCN) is added to each RoI. In order to perform a segmentation task more effectively, an RoIAlign layer may be added to preserve a spatial location of an object.

Here, the segmentation mask refers to an image segment resulting from image segmentation by class and allows effective encoding of spatial information about an object in an image.

The RoIAlign layer may also be used to solve misalignment between features and regions of interest (RoIs).

In this way, accuracy of draft measurement can be enhanced by preventing errors in image processing that can occur depending on the shooting angle, the picture quality, the degree of surface contamination of a hull, and the like.

The draft measurement reference point definition unit 240 may perform semantic segmentation for localization of waterline edges using an artificial intelligence model including U-Net to detect the waterline and may define the draft measurement reference point by a point of intersection between the segmented waterline and a straight line selected using a voting algorithm based on the object detected by the object recognition unit 220 and the segmented waterline.

That is, the AI model including Mask R-CNN is used in object (mark) detection and localization from each image frame extracted from the video data, while the AI model including U-Net is used in semantic segmentation for localization of waterline edges. Draft calculation (in pixels) based on the object (mark) detected by AI recognition technology and the segmented waterline requires a draft point. In order to designate the draft point along a line in which a corresponding draft mark is located, the reference point for draft calculation is defined by a point at which a straight line selected using the voting algorithm intersects the segmented waterline at a lower middle portion of a bounding box surrounding n marks located directly above the waterline and recognized as an object.

The distortion correction unit 250 may correct size distortion of a draft mark due to a shooting position using a scaling algorithm.

Here, the scaling algorithm refers to an algorithm that corrects distortion by estimating a height of a mark based on proportional variations in size of the mark across image frames.

More specifically, the scaling algorithm is configured to model proportional variations in size (in pixels) of a mark across image frames as a function of y direction (height direction) and estimate the height (in pixels) of the mark in the y direction based thereon.

In addition, the distortion correction unit 250 may perform perspective transformation assuming a surface of the ship with draft marks marked thereon to be a flat surface, may correct distortion in the X-axis direction by measuring a level of the waterline from the video data corrected through perspective transformation, and may correct distortion in the Y-axis direction by predicting a value of the Y-axis through correction of distortion in the X-axis direction.

The draft measurement system according to the present invention may further include a monitoring server 300 that displays a draft calculated by the calculation unit 270 for the purpose of monitoring or stores the calculated draft therein.

That is, the monitoring server 300 may include a storage unit 310 storing the calculated draft and a display unit displaying the calculated draft for the purpose of real-time monitoring.

Figure 10:
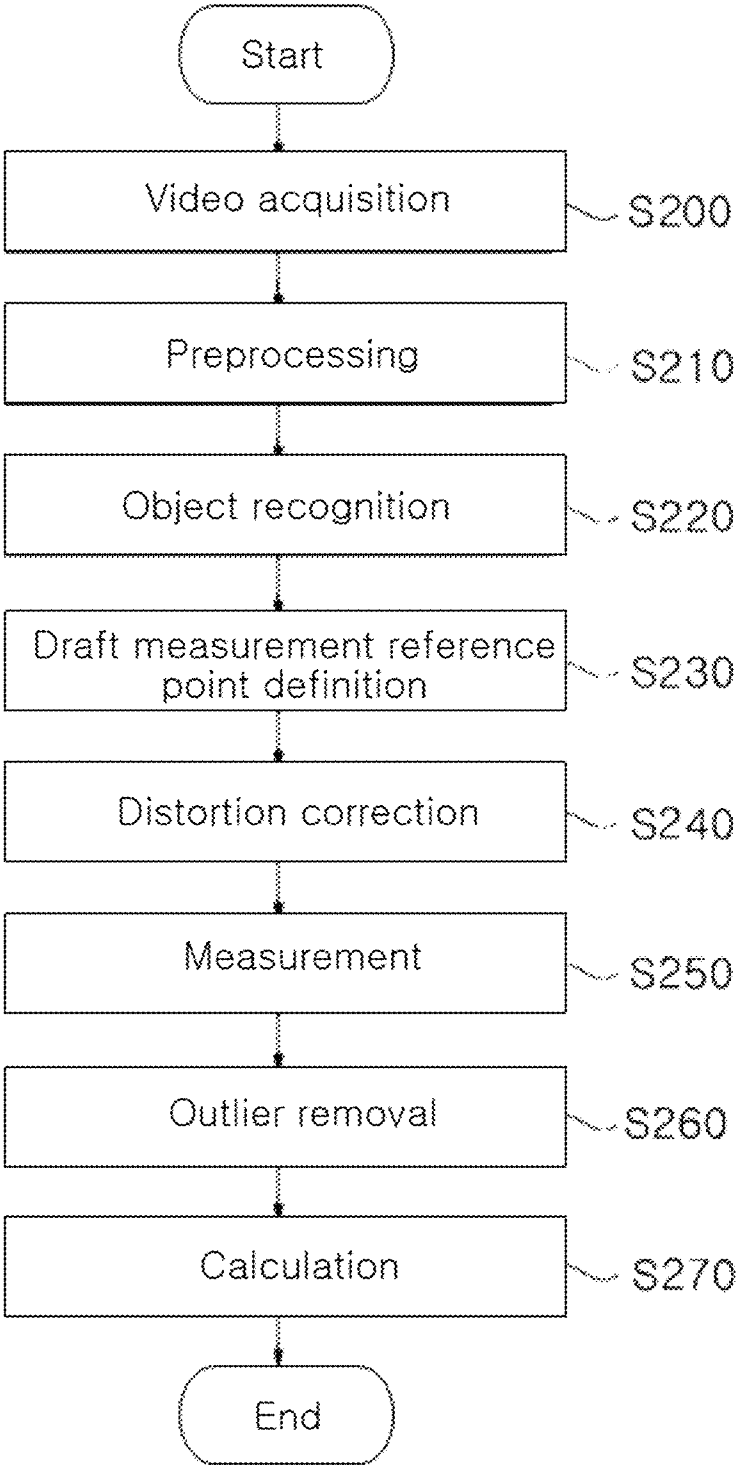
FIG. 10 is a flow diagram of a draft measurement method based on image processing using artificial intelligence technology according to another embodiment of the present invention.
Figure 11:
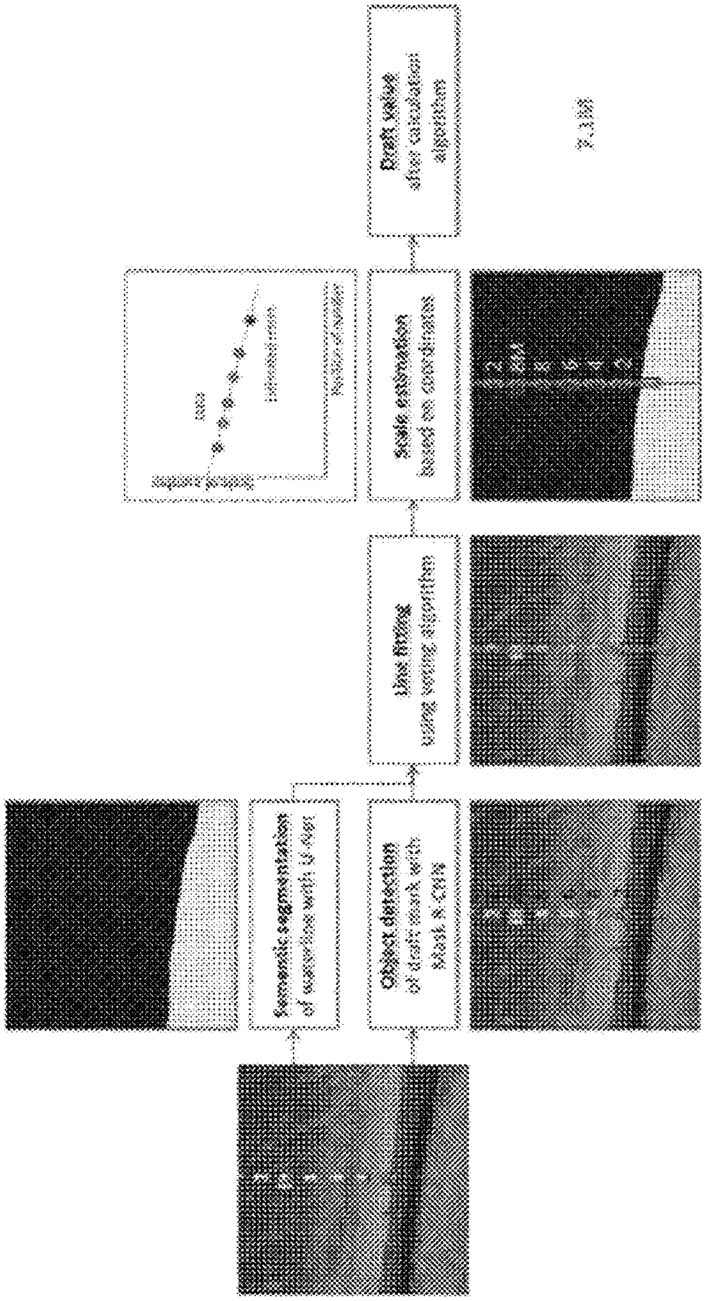
FIG. 11 is a view illustrating image recognition and calculation processes performed by draft calculation algorithms used in a draft measurement system based on image processing using artificial intelligence technology according to another embodiment of the present invention.

Referring to FIG. 10, a draft measurement method based on image processing using artificial intelligence technology according to another embodiment of the present invention may include: a video acquisition step S200 in which a video acquisition device photographs a waterplane and draft marks including numbers marked on both sides of a ship; a preprocessing step S210 in which a draft measurement system receives a video captured by the video acquisition device in the video acquisition step S200 and a preprocessing unit of the draft measurement system converts the received video into image frames; an object recognition step S220 in which the draft measurement system detects and localizes a draft mark as an object from each of the image frames obtained in the preprocessing step S210; a draft measurement reference point definition step S230 in which the draft measurement system detects a waterline from the image frames obtained in the preprocessing step S210 and defines a draft measurement reference point; a distortion correction step S240 in which the draft measurement system corrects distortion in the draft mark recognized in the object recognition step S210 and distortion in the reference point defined in the draft measurement reference point definition step S230; a measurement step S250 in which the draft measurement system measures a distance from the draft mark corrected in the distortion correction step S240 to the draft measurement reference point corrected in the distortion correction step S240; an outlier removal step S260 in which the draft measurement system removes outliers from data measured in the measurement step S250; and a calculation step S270 in which the draft measurement system calculates a draft based on the data subjected to outlier removal in the outlier removal step S260.

The object recognition step S220 may include detecting and localizing a draft mark as an object from the image frames using a Mask R-CNN model.

The draft measurement reference point definition step S230 includes a segmentation step S231 in which the draft measurement system performs semantic segmentation for localization of waterline edges using an artificial intelligence model including U-Net to detect the waterline, wherein the draft measurement reference point may be defined by a point of intersection between the segmented waterline and a straight line selected using a voting algorithm based on the object detected in the object recognition step S220 and the waterline segmented in the segmentation step S231.

Figure 12:
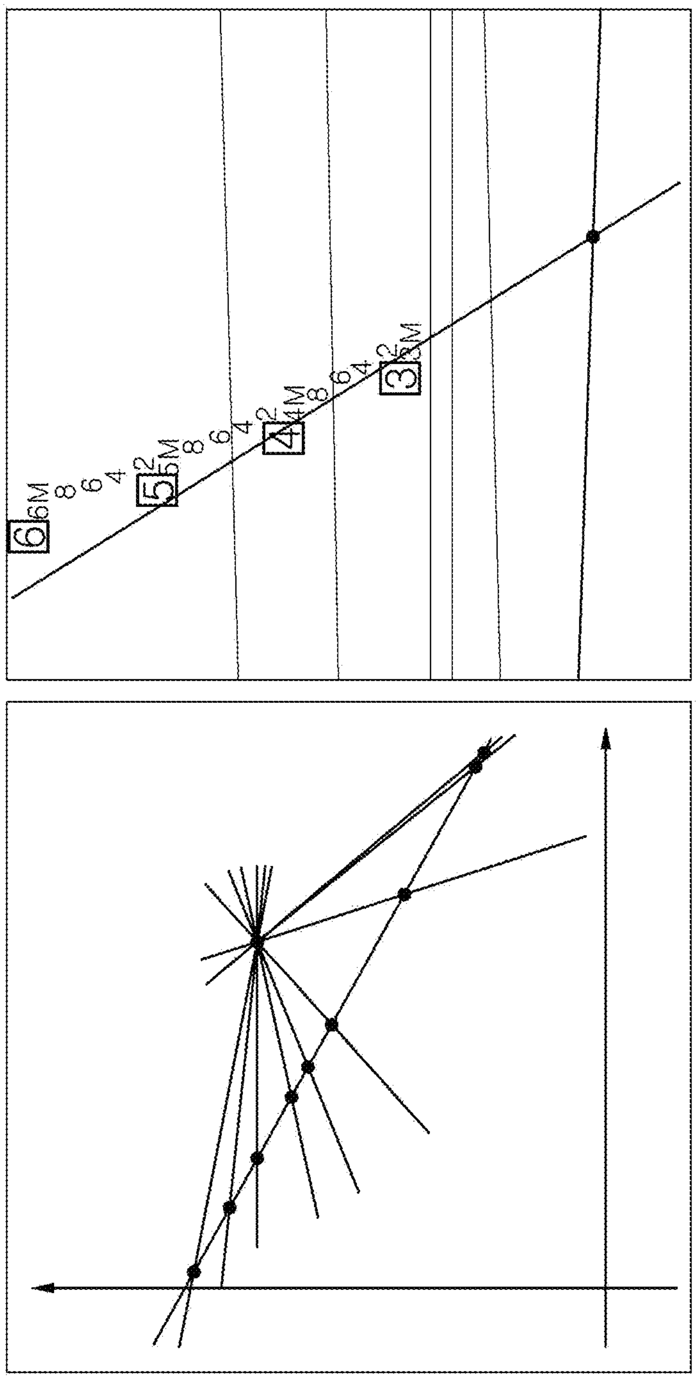
FIG. 12 is a view illustrating an algorithm for estimating the position of a reference point among the draft calculation algorithms used in the draft measurement system according to the other embodiment of the present invention.

Referring to FIG. 12, the draft measurement reference point may be used to estimate the position of a draft point along a straight line. In order to estimate the position of the draft point, the reference point for draft calculation is defined by a point at which a straight line selected using the voting algorithm intersects the segmented waterline at a lower middle portion of a bounding box surrounding n marks located directly above the waterline and recognized as an object.

Here, the voting algorithm employs a concept similar to majority voting. There are many straight lines that can be drawn by connecting any two of the red dots in the graph of FIG. 12(*a*). Thereamong, a straight line having received the most votes is selected as a straight line for estimation.

Accordingly, even when the position of a draft mark in an image frame changes depending on the shooting position, the draft measurement system can accurately define the draft point for draft calculation using the voting algorithm.

Figure 13:
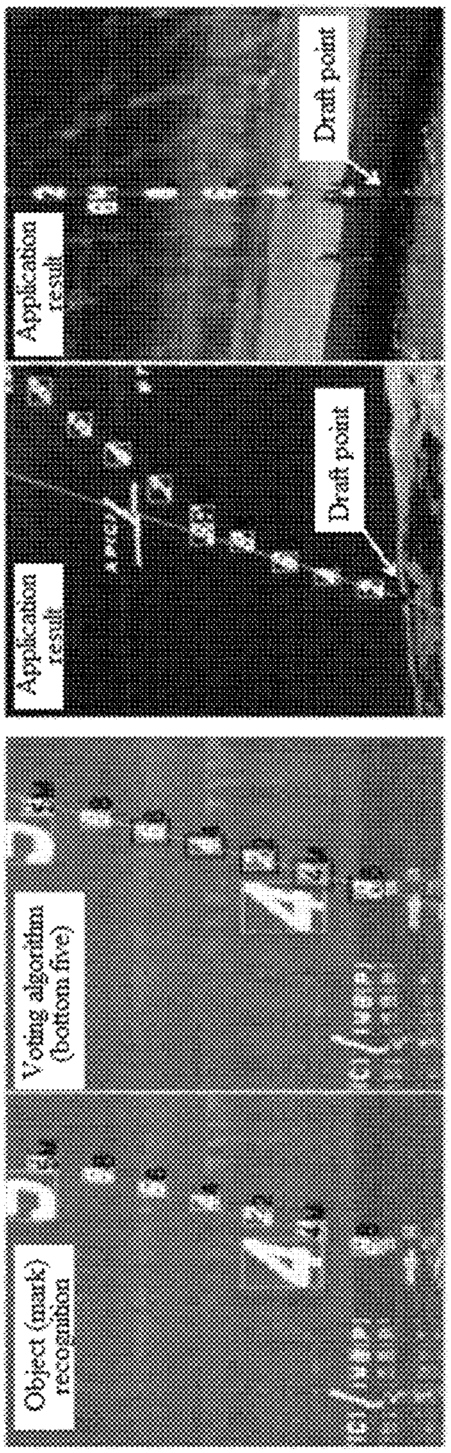
FIG. 13 is a view illustrating the results of applying a voting algorithm among the draft calculation algorithms used in the draft measurement system according to the other embodiment of the present invention.

FIG. 13 illustrates the results of applying the voting algorithm in the draft measurement method according to the present invention.

FIG. 13(*a*) shows the state in which draft marks are recognized in the object recognition step, and FIG. 13(*b*) shows the state in which bottom five lines are adopted through the voting algorithm.

In addition, FIG. 13(*c*) and FIG. 13(*d*) show the draft marks and the draft point after application of the voting algorithm.

The distortion correction step S240 includes correcting size distortion of the draft mark due to a shooting position using a scaling algorithm, wherein the scaling algorithm may correct distortion by estimating a height of a mark based on proportional changes in size of the mark across image frames.

Figure 14:
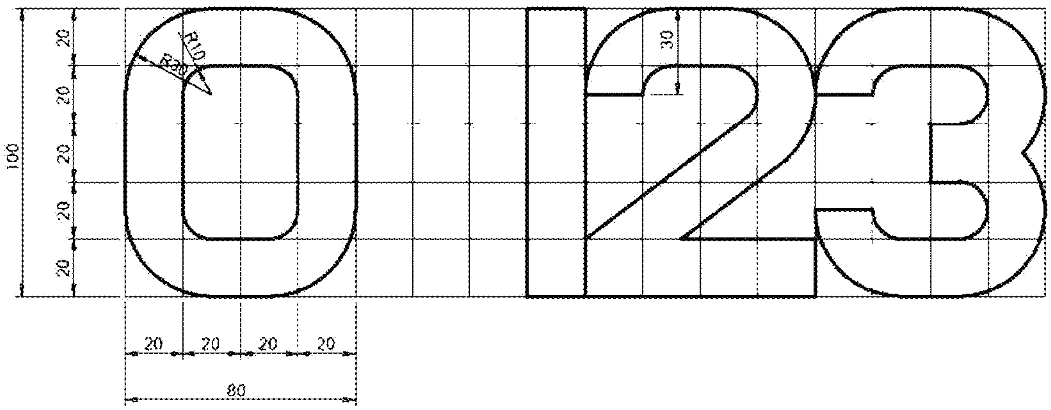
FIG. 14 and FIG. 15 are views illustrating a scaling algorithm among the draft calculation algorithms used in the draft measurement system according to the other embodiment of the present invention.
Figure 15:
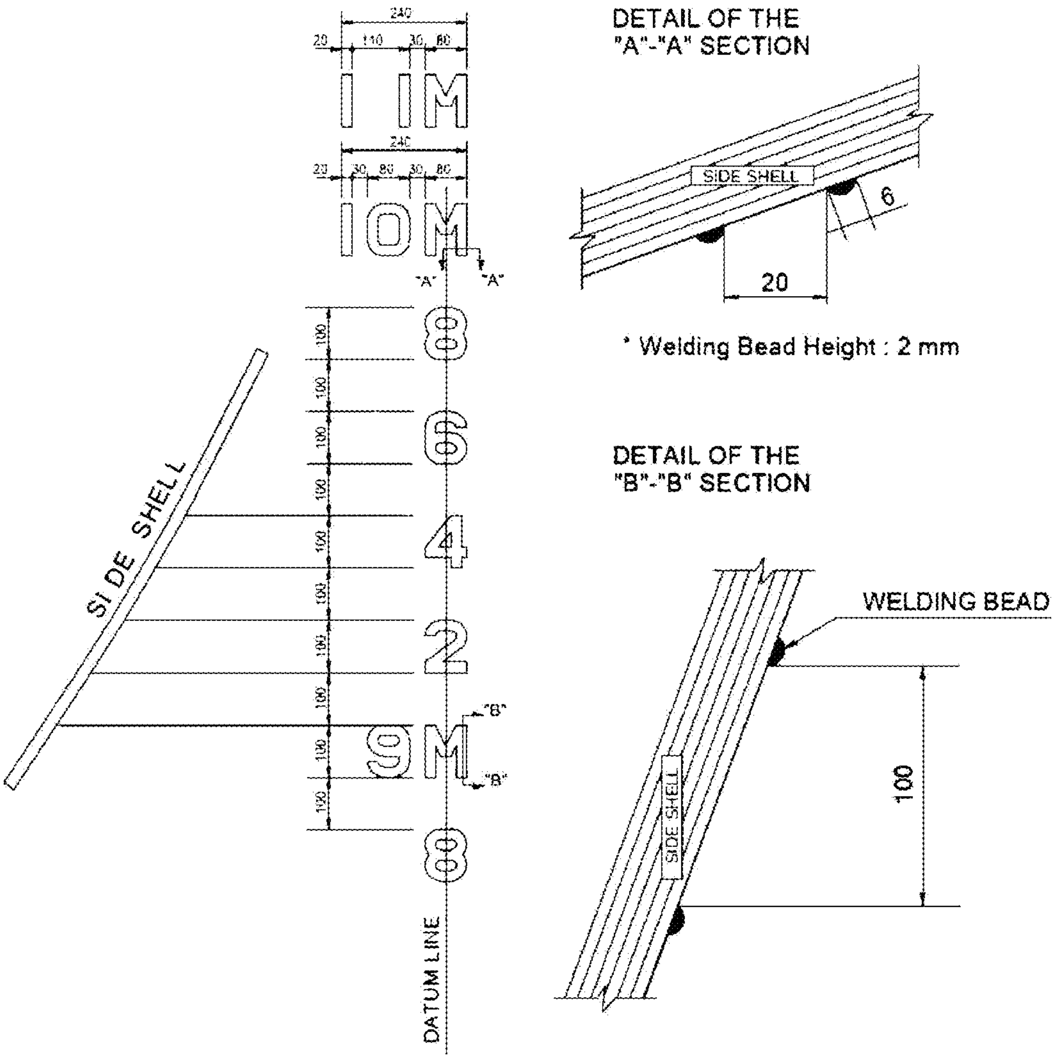

FIG. 14 shows standards for marking draft marks on a flat surface, and FIG. 15 shows standards for marking draft marks on a curved surface.

Figure 16:
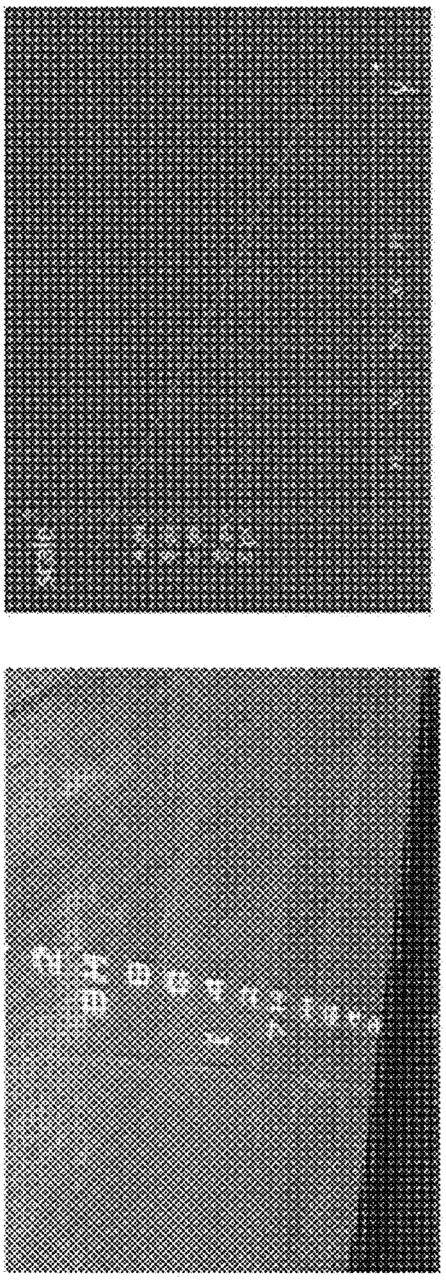
FIG. 16 is a view illustrating an algorithm for estimating the height of a character among the draft calculation algorithms used in the draft measurement system according to the other embodiment of the present invention.

FIG. 16(*a*) is a view illustrating variations in size of a character due to perspective distortion, and FIG. 16(*b*) is a view illustrating modeling of estimation of a height of the character (in pixels) as a function of y-value of the video data.

Thus, the scaling algorithm uses distortion, such as variations in size of a draft mark depending on whether the draft mark is marked on a curved surface or a flat surface of the ship, variations in size of the draft mark across image frames depending the user's shooting position, and the like, to correct errors in draft calculation by the draft measurement system.

That is, the scaling algorithm is configured to model proportional variations in size (in pixels) of the draft mark across image frames as a function of y direction (height direction) and estimate the height (in pixel) of the draft mark in any y-direction based thereon.

Figure 17:
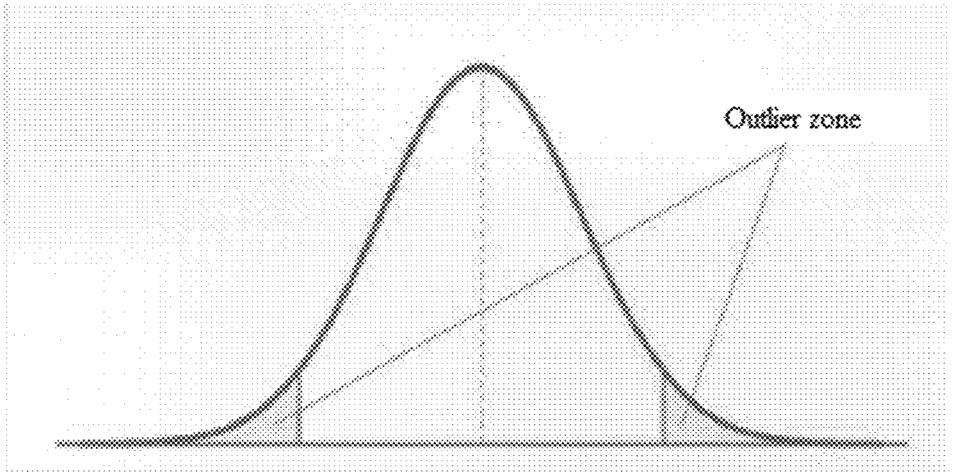
FIG. 17 is a view illustrating an outlier criterion application algorithm for deriving a final draft value among the draft calculation algorithms used in the draft measurement system according to the other embodiment of the present invention.
Figure 17:
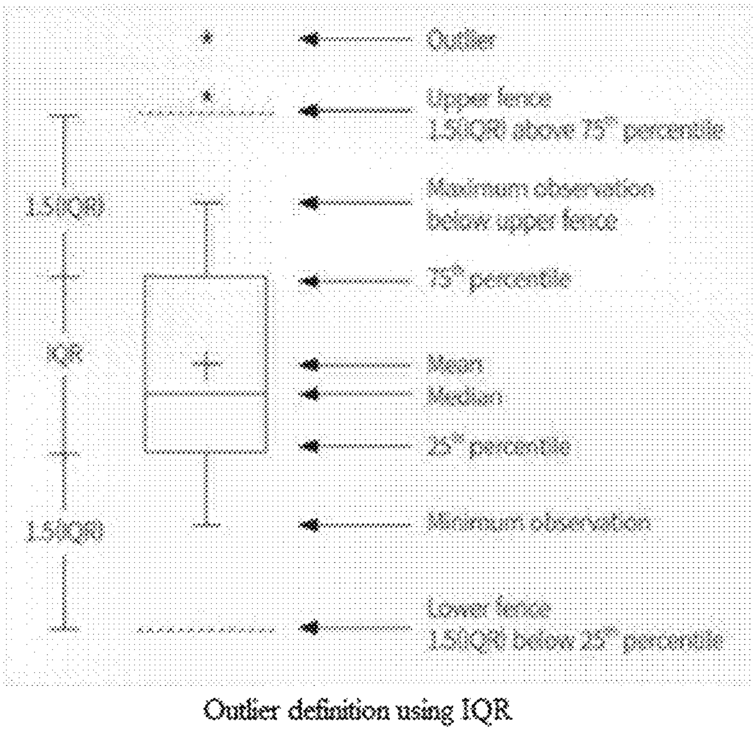

Referring to FIG. 17, the outlier removal step S260 may include detecting outliers in analysis results of each image frame based on statistical univariate data, such as standardized scores and interquartile ranges, removing the outliers from the analysis results, and deriving a final draft value as an arithmetic mean.

That is, the outlier removal step allows reliable calculation of the final draft value as an arithmetic mean by removing outliers from the analysis results of each image frame through application of an outlier criterion to the analysis results.

In addition, outlier detection for primary analysis results may be performed based on statistical univariate data, such as standardized scores and interquartile ranges.

The draft measurement method according to the present invention may further include a monitoring step in which the draft value calculated in the calculation step is transmitted to a monitoring unit to be displayed and monitored in real time or to be stored.

The draft measurement method according to the present invention can ensure more accurate and rapid waterline measurement than visual measurement.

As described above, the draft measurement system and method according to the present invention can improve the accuracy of draft measurement by preventing errors in image processing that can occur depending on the shooting angle, the picture quality, the degree of surface contamination of a hull, and the like, through application of artificial intelligence technology to images extracted from video data.

In addition, the draft measurement system and method according to the present invention can determine a draft value based on video data acquired in real time using technology such as a deep learning model for segmentation for draft mark edge detection and waterplane recognition, an edge detection algorithm and distortion correction algorithm for waterplane detection, a drone and a handheld video camera, and video reception/transmission and streaming technology.

Further, the draft measurement system and method according to the present invention can prevent accidents that can occur during draft measurement, such as musculoskeletal injuries, crush injuries, and drowning, while ensuring acquisition of reliable and accurate measurements, as compared with direct visual measurement.

Embodiments of the present invention described above may be implemented in the form of program instructions executable by various computer components and recorded on a computer-readable recording medium. The computer-readable recording medium may include program instructions, a data file, a data structure, etc. solely or in combination. The program instructions recorded on the computer-readable recording medium may be specially designed and constructed for the present invention or may be those known and available to those skilled in the art of computer software. Examples of the computer-readable medium include a hardware device specifically configured to store and execute the program instructions, including: magnetic media, such as hard disks, floppy disks, and magnetic tape; optical recording media, such as CD-ROMs and DVDs; magneto-optical media, such as floptical disks; ROMs; RAMs; and flash memories. Examples of the program commands include not only machine language code generated by a compiler, but also high-level language code executable on a computer using an interpreter or the like. The hardware device may be configured to operate as one or more software modules to perform the operations according to the present invention, or vice versa.

Although some embodiments have been described herein, it should be understood that these embodiments are provided for illustration only and are not to be construed in any way as limiting the present invention, and that various modifications and changes can be made by those skilled in the art without departing from the spirit and scope of the invention.

Therefore, the accompanying claims and their equivalents are intended to cover such changes or modifications as would fall within the scope and spirit of the present invention.

LIST OF REFERENCE NUMERALS: FREE TEXT

50: Network
100: Drone
110: Video acquisition device such as camcorder
200: Draft measurement system
210: Preprocessing unit
220: Draft mark recognition unit, Object recognition unit
230: Extraction unit, Detection unit
240: Waterline detection unit, Draft measurement reference point definition unit
250: Measurement unit, Distortion correction unit
260: Distortion correction unit, Measurement unit
270: Calculation unit
300: Monitoring server
310: Storage unit
320: Display unit

The invention claimed is:

1. A draft measurement system based on image processing using artificial intelligence technology, comprising:

a drone or a video acquisition device photographing a waterplane and draft marks comprising numbers marked on both sides of a ship, the video acquisition device comprising a camcorder; and a draft measurement system receiving a video captured by the drone or the video acquisition device and calculating a draft based thereon, the draft measurement system comprising:

a preprocessing unit converting the received video into image frames;

a draft mark recognition unit recognizing a draft mark from the image frames obtained by the preprocessing unit;

a waterline detection unit detecting a waterline from the image frames obtained by the preprocessing unit;

a measurement unit measuring a distance in pixels from the draft mark recognized by the draft mark recognition unit to the waterline detected by the waterline detection unit;

a distortion correction unit correcting distortion in X-axis and Y-axis directions in data measured by the measurement unit; and a calculation unit calculating a draft based on the data corrected by the distortion correction unit.

2. The draft measurement system according to claim 1, wherein the waterline detection unit comprises an extraction unit detecting waterline edges from the image frames to recognize a waterplane through segmentation based on the waterline edges detected by the extraction unit.

3. The draft measurement system according to claim 1, wherein the measurement unit comprises:

a first measurement unit measuring a distance in pixels from the draft mark recognized by the draft mark recognition unit to a draft mark above the waterline; and a second measurement unit measuring a distance in pixels from the draft mark recognized by the draft mark recognition unit to the waterline.

4. The draft measurement system according to claim 1, wherein the distortion correction unit performs perspective transformation assuming a surface of the ship with the draft marks marked thereon to be a flat surface, corrects distortion in the X-axis direction by measuring a level of the waterline from the video corrected through perspective transformation, and corrects distortion in the Y-axis direction by predicting a value in the Y-axis direction through correction of distortion in the X-axis direction.

5. The draft measurement system according to claim 1, further comprising:

a monitoring server displaying the draft calculated by the calculation unit in real time for a monitoring purpose or storing the calculated draft.

6. A draft measurement system based on image processing using artificial intelligence technology, comprising:

a drone or a video acquisition device photographing a waterplane and draft marks comprising numbers marked on both sides of a ship, the video acquisition device comprising a camcorder; and a draft measurement system receiving a video captured by the drone or the video acquisition device and calculating a draft based thereon, the draft measurement system comprising:

a preprocessing unit converting the received video into image frames;

an object recognition unit detecting and localizing a draft mark as an object from the image frames obtained by the preprocessing unit;

a draft measurement reference point definition unit detecting a waterline from the image frames obtained by the preprocessing unit and defining a draft measurement reference point;

a distortion correction unit correcting distortion in the draft mark recognized by the object recognition unit and distortion in the draft measurement reference point defined by the draft measurement reference point definition unit;

a measurement unit measuring a distance from the draft mark corrected in distortion by the distortion correction unit to the draft measurement reference point corrected in distortion by the distortion correction unit; and a calculation unit calculating a draft based on data measured by the measurement unit.

7. A draft measurement method based on image processing using artificial intelligence technology, comprising:

a video acquisition step in which a drone or a video acquisition device, such as a camcorder, photographs a waterplane and draft marks comprising numbers marked on both sides of a ship;

a preprocessing step in which a draft measurement system receives a video captured by the drone or the video acquisition device in the video acquisition step and a preprocessing unit of the draft measurement system converts the received video into image frames;

a draft mark recognition step in which the draft measurement system recognizes a draft mark from the image frames obtained in the preprocessing step;

a waterline detection step in which the draft measurement system detects a waterline from the image frames obtained in the preprocessing step;

a measurement step in which the draft measurement system measures a distance in pixels from the draft mark recognized in the draft mark recognition step to the waterline detected in the waterline detection step; a distortion correction step in which the draft measurement system corrects distortion in X-axis and Y-axis directions in data measured in the measurement step; and a calculation step in which the draft measurement system calculates a draft based on the data corrected in the distortion correction step.

8. The draft measurement method according to claim 7, wherein the waterline detection step comprises:

detecting, by the draft measurement system, waterline edges to detect the waterline; and recognizing, by the draft measurement system, a waterplane through segmentation based on the detected waterline edges.

9. The draft measurement method according to claim 7, wherein the measurement step comprises:

a first measurement step in which a deep learning model of the draft measurement system measures a distance in pixels from the draft mark recognized in the draft mark recognition step to a draft mark above the waterline; and a second measurement step in which the deep learning model of the draft measurement system measures a distance in pixels from the draft mark recognized in the draft mark recognition step to the waterline.

10. The draft measurement method according to claim 7, wherein the distortion correction step comprises:

a perspective transformation step in which a surface of the ship with the draft marks marked thereon is assumed to be a flat surface;

an X-axis distortion correction step in which distortion in the X-axis direction is corrected by measuring a level of the waterline from the video corrected in the perspective transformation step; and a Y-axis distortion correction step in which distortion in the Y-axis direction is corrected by predicting a value in the Y-axis direction through the X-axis distortion correction step.

11. The draft measurement method according to claim 7, further comprising:

a monitoring step in which the draft calculated in the calculation step is transmitted to a monitoring server to be displayed and monitored in real time or to be stored.

12. A draft measurement method based on image processing using artificial intelligence technology, comprising:

a video acquisition step in which a video acquisition device photographs a waterplane and draft marks comprising numbers marked on both sides of a ship;

a preprocessing step in which a draft measurement system receives a video captured by the video acquisition device in the video acquisition step and a preprocessing unit of the draft measurement system converts the received video into image frames;

an object recognition step in which the draft measurement system detects and localizes a draft mark as an object from each of the image frames obtained in the preprocessing step;

a draft measurement reference point definition step in which the draft measurement system detects a waterline from the image frames obtained in the preprocessing step and defines a draft measurement reference point;

a distortion correction step in which the draft measurement system corrects distortion in the draft mark recognized in the object recognition step and distortion in the reference point defined in the draft measurement reference point definition step;

a measurement step in which the draft measurement system measures a distance from the draft mark corrected in the distortion correction step to the draft measurement reference point corrected in the distortion correction step;

an outlier removal step in which the draft measurement system removes outliers from data measured in the measurement step; and a calculation step in which the draft measurement system calculates a draft based on the data subjected to outlier removal in the outlier removal step.

13. The draft measurement method according to claim 12, wherein the object recognition step comprises detecting and localizing a draft mark as an object from the image frames using a Mask R-CNN model.

14. The draft measurement method according to claim 12, wherein the draft measurement reference point definition step comprises:

a segmentation step in which the draft measurement system performs semantic segmentation for localization of waterline edges using an artificial intelligence model including U-Net to detect the waterline, wherein the draft measurement reference point is defined by a point of intersection between the segmented waterline and a straight line selected using a voting algorithm based on the object detected in the object recognition step and the waterline segmented in the segmentation step.

15. The draft measurement method according to claim 12, wherein the distortion correction step comprises correcting size distortion of a draft mark due to a shooting position using a scaling algorithm, the scaling algorithm being configured to correct the distortion by estimating a height of the draft mark based on proportional variations in size of the draft mark across image frames.

16. The draft measurement method according to claim 12, wherein the outlier removal step comprises detecting outliers in analysis results of each image frame based on statistical univariate data, such as standardized scores and interquartile ranges, removing the outliers from the analysis results, and deriving a final draft value as an arithmetic mean.

17. The draft measurement method according to claim 12, further comprising:

a monitoring step in which the draft calculated in the calculation step is transmitted to a monitoring unit to be displayed and monitored in real time or to be stored.

18. A non-transitory computer-readable storage medium storing a computer program, when executed by a computer, causes the computer to perform the draft measurement method based on image processing using artificial intelligence technology according to claim 7.

19. A non-transitory computer-readable storage medium storing a computer program, when executed by a computer, causes the computer to perform the draft measurement method based on image processing using artificial intelligence technology according to claim 12.

* * * * *